United States Patent [19]

Kinoshita et al.

[11] Patent Number: 4,607,540
[45] Date of Patent: Aug. 26, 1986

[54] ADJUSTABLE AUTOMOTIVE STEERING COLUMN WITH ADJUSTABLE TILT AND TOP-POSITION LOCK

[75] Inventors: Satoshi Kinoshita; Yoshimi Yamamoto, both of Shizuoka, Japan

[73] Assignee: Fuji Kiko Company, Limited, Tokyo, Japan

[21] Appl. No.: 659,765

[22] Filed: Oct. 11, 1984

[30] Foreign Application Priority Data

Oct. 19, 1983 [JP] Japan .................... 58-195848

[51] Int. Cl.⁴ .................................. B62D 1/18
[52] U.S. Cl. ........................... 74/493; 74/534; 74/541
[58] Field of Search ............ 74/493, 533, 534, 540, 74/541; 280/775

[56] References Cited

U.S. PATENT DOCUMENTS

| | | | |
|---|---|---|---|
| 3,302,478 | 2/1967 | Pauwels | 74/493 |
| 3,355,962 | 12/1967 | Gerdes et al. | 74/493 |
| 3,421,385 | 1/1969 | Sippel | 74/493 |
| 4,033,158 | 7/1977 | Chamberlain et al. | 280/775 X |
| 4,078,448 | 3/1978 | Naka | 74/493 |
| 4,102,218 | 7/1978 | Naka et al. | 74/493 |
| 4,300,407 | 11/1981 | Köpf | 74/493 |
| 4,422,346 | 12/1983 | Nishikawa | 280/775 X |
| 4,463,626 | 8/1984 | Kazaoka et al. | 74/493 |
| 4,530,254 | 7/1985 | Toyoda et al. | 74/493 |

FOREIGN PATENT DOCUMENTS

| | | |
|---|---|---|
| 277501 | 1/1966 | Australia . |
| 294869 | 8/1968 | Australia . |
| 525003 | 8/1982 | Australia . |
| 2630370 | 6/1977 | Fed. Rep. of Germany . |
| 52-79448 | 7/1977 | Japan . |
| 57-90266 | 6/1982 | Japan . |
| 57-147957 | 9/1982 | Japan . |
| 57-155156 | 9/1982 | Japan . |
| 57-209468 | 12/1982 | Japan . |
| 58-85757 | 5/1983 | Japan . |
| 58-85756 | 5/1983 | Japan . |
| 939114 | 10/1963 | United Kingdom . |
| 1137400 | 12/1968 | United Kingdom . |

OTHER PUBLICATIONS

U.S. patent application Ser. No. 494,573 for Automotive Steering Column Tilt Adjusting Device (specification, claims, drawings), filed 5-13-83.

Primary Examiner—Allan D. Herrmann
Attorney, Agent, or Firm—Bachman & LaPointe

[57] ABSTRACT

A pivotable steering column is adjustable to any of a number of angular positions defined by the teeth of two elements of a first locking device. A manual lever can be raised to disable the first lock and allow selection of a different steering wheel inclination. The steering wheel can be moved to its uppermost position by lowering the manual lever once. In this case, the first lock maintains engagement of the teeth of the aforementioned two element, and a powerful spring pulls the steering column upward to the uppermost position irrespective of the first lock. A second lock then becomes wedged between the pivotable and stationary parts of the steering column, thus holding the former in the uppermost position. Lowering the manual lever a second time disengages the second lock, allowing the steering column tilt cown from the uppermost position. Thus, the steering column returns to an originally set driving position defined by locking engagement of the first lock.

10 Claims, 8 Drawing Figures

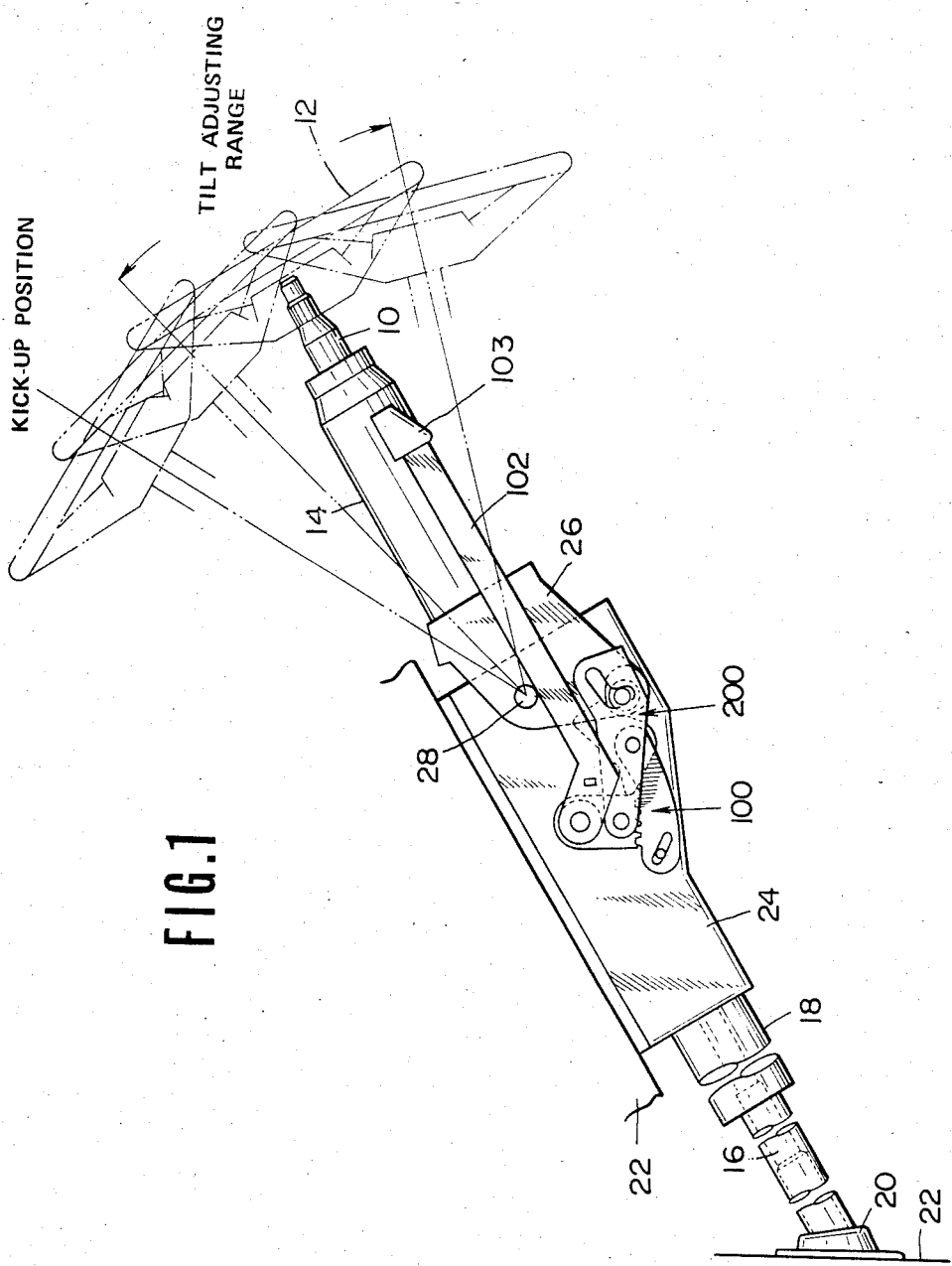

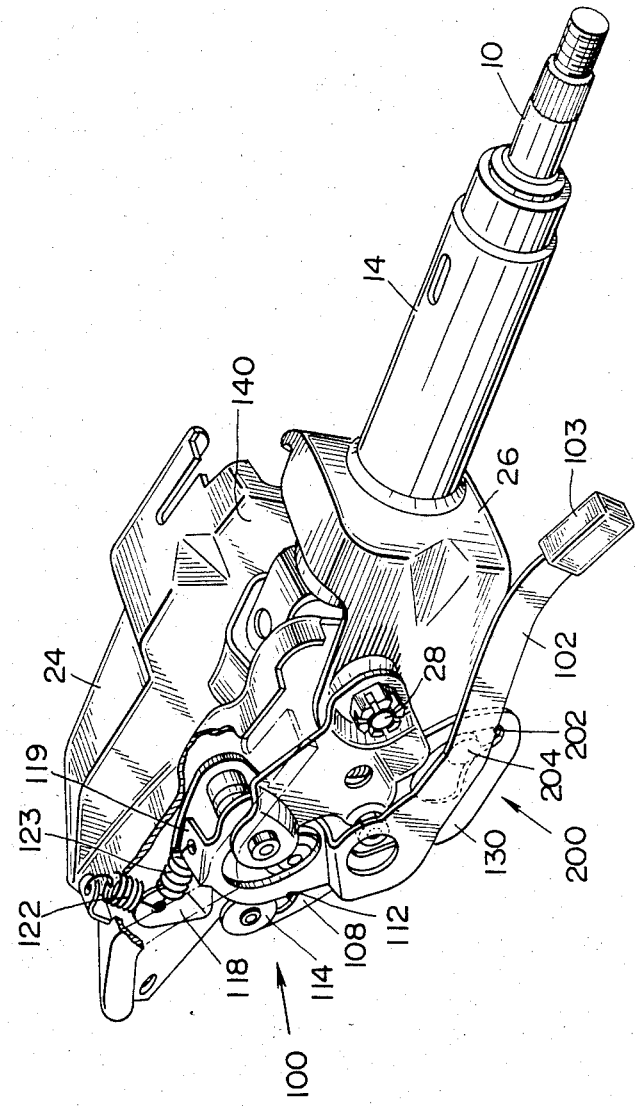

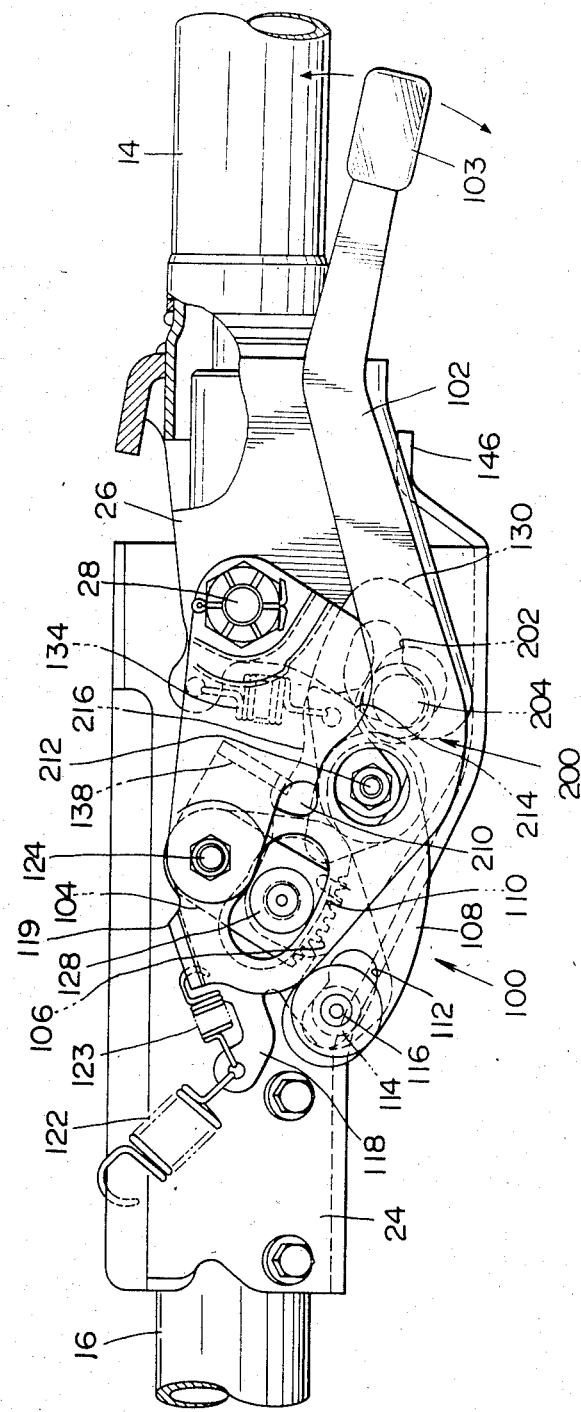

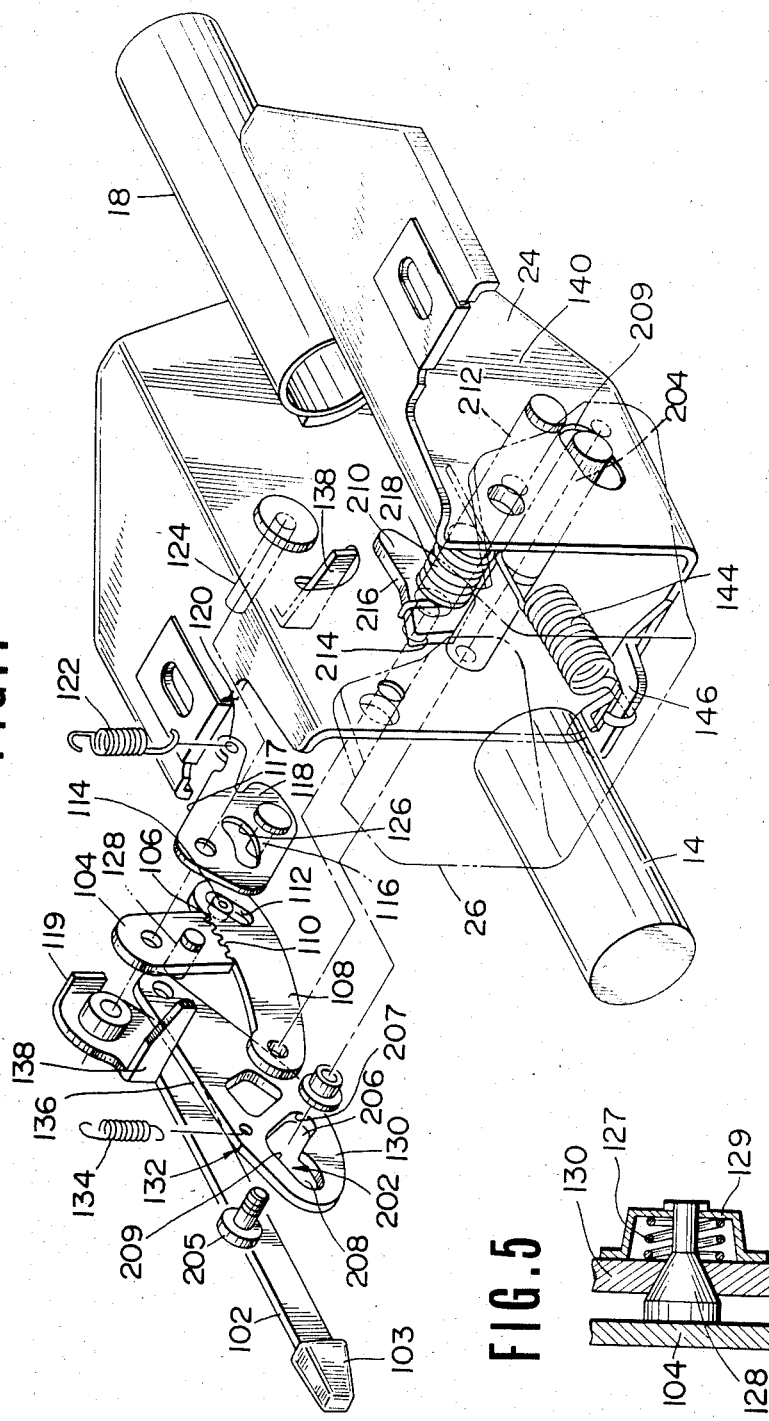

ADJUSTABLE AUTOMOTIVE STEERING COLUMN WITH ADJUSTABLE TILT AND TOP-POSITION LOCK

BACKGROUND OF THE INVENTION

The present invention relates generally to a tilt-angle adjustable automotive steering column which allows adjustment of the tilt angle thereof for adaptation to a vehicle driver. More particularly, the invention relates to an auxiliary lock mechanism which locks the steering at its uppermost position when the driver is getting into and out of the vehicle cabin.

Various tilt adjustment mechanisms for automotive steering columns are currently available. Such adjustment mechanisms allow adjustment of the steering column tilt angle for adjustment of the height and tilt of the steering wheel. Some adjustable tilt steering columns include features which temporarily pivot the steering columns to its uppermost position to provide the greatest possible space for the driver to get into and out of the vehicle cabin. One of such adjustable tilt steering column has been disclosed in Published Japanese Patent Applications (Tokkai) No. 58-85756 and 58-85757, which correspond to the co-pending patent application Ser. No. 494,573 and to the co-pending European Patent Application No. 83104817.8. In this steering mechanism, this temporary tilt-up operation is employed. When the steering column is temporarily tilted up out of adjustable range allowing tilt angle of the steering column, the previously selected steering column position or originally set driving position is mechanically recorded so that the steering column can be returned to the previous driving position simply by pulling the steering column down until it stops.

In this prior steering column tilt-adjusting mechanism, it would be more useful to provide an auxiliary lock mechanism for temporarily locking the steering in its uppermost position.

SUMMARY OF THE INVENTION

Therefore, it is an object of the present invention to provide a steering column tilt adjusting mechanism which can temporarily lock the steering column at its uppermost position to provide the greatest possible space for a driver to get into and out of the vehicle cabin, and to prevent the steering column and the steering wheel from accidentally causing downward movement while the driver grips the steering wheel.

Another and more specific object of the present invention is to provide an auxiliary lock mechanism in a adjustable tilt automotive steering column capable of locking the steering column its uppermost position in response to a kick-up operation performed immediately prior to entry into and exit from the vehicle cabin.

In order to accomplish the aforementioned and other objects, an automotive steering device according to the present invention performs a kick-up operation by which the steering column is moved temporarily to its uppermost position when a driver gets into or out of the vehicle cabin. The steering device includes an auxiliary lock mechanism operative in response to the kick-up operation to lock the steering column in its uppermost position.

In the preferred construction, the steering device is further provided with a primary lock mechanism which locks the steering column at any of a number of angular positions to originally set a driving position within a predetermined variation range between a first upper extreme and a second lower extreme. The primary lock mechanism is preferably provided with a mechanical device which records the originally set driving position. This mechanical memory allows the steering wheel to be returned directly to the desired position from the aforementioned kick-up position.

In another preferred embodiment, the uppermost position to which the steering column is moved when kick-up operation is performed is higher than that the above-mentioned first extreme.

According to one aspect of the invention, an adjustable tilt steering column comprises a steering column receiving a steering shaft with a steering wheel attached to its free end, the steering column including a first stationary component and a second movable component which is pivotable with the steering shaft for allowing tilt adjustment of the steering shaft relative to the first component, a first locking means associated with the steering column for locking the second component of the steering column at a selected angular position, the angular position being variable between a first upper and a second lower extremes, second means allowing the second component to move upwardly beyond the first extreme to a third uppermost position, a third locking means associated with the second means and responsive to operation of the latter to lock the second component at the third uppermost position a fourth means, for recording said selected angular position during operation of said second and third means, and a manually operable device for selectably disabling the first means to allow adjustment of the angular position within an adjusting range defined by the first and second extremes, for selectably activating the second means to move the second component to the uppermost position and locking the second component at the uppermost position by means of the third means, and for selectably disabling the third locking means to allow downward movement of the second component to within the adjusting range and subsequent operation of the first locking means.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 1 is a side elevation of the preferred embodiment of an adjustable tilt automotive steering column according to the invention;

FIG. 2 is a perspective view of the major portion of the steering column of FIG. 1;

FIG. 3 is an enlarged side elevation of the major portion of the steering column of FIG. 1;

FIG. 4 is an exploded perspective view showing components of the major part of the steering column of FIG. 1;

FIG. 5 is a cross-section showing connection between a toothed plate and a link lever shown in FIG. 4;

DESCRIPTION OF THE PREFERRED EMBODIMENT

Figure 6:
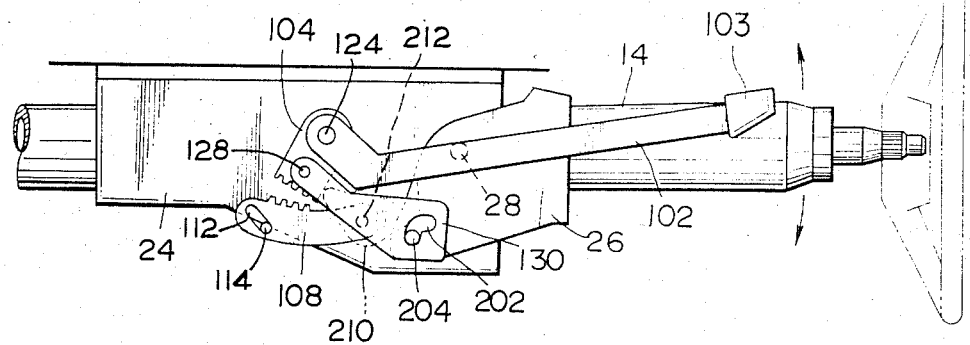
FIG. 6 is a fragmentary illustration showing tilt adjustment operation in a position wherein tilt angle adjustment is permitted.

Referring now to the drawings, FIG. 1 shows an adjustable tilt automotive steering column. The steering column includes a steering shaft which consists of an upper section 10 mounting a steering wheel 12 at the top thereof, and a lower section 16 connected to the upper section via a universal joint 20. The upper section 10 extends through an upper steering column sleeve 14. The lower section extends through a lower steering column tube 18. The lower end of the lower steering column sleeve 18 is firmly secured to a dash panel 22 of a vehicle body by means of a dash bracket 20. The lower section 16 of the steering shaft extends through dash panel 22 and connects to a steering mechanism (not shown) at its lower end.

The upper end of the lower steering column tube 18 is secured to an instrument panel by means of a generally U-shaped stationary bracket 24 which is fixed to the instrument panel. A movable bracket 26 retaining the upper steering column 14 is pivotably secured to the stationary bracket 24. The pivotal range of the movable bracket about its pivotal axis 28 under normal conditions is shown in FIG. 1 labelled "tilt adjusting range". The movable bracket 26 can be pivotted higher about the pivot 28 temporarily. Temporary displacement of the steering wheel 12 beyond the uppermost point of the tilt adjusting range may help the driver get in and out a of the seat (not shown). This temporary upward movement will be hereafter referred to as "kick-up movement" and the position to which the steering axis is moved by the kick-up movement will be hereafter referred to as the "kick-up position".

A tilt adjusting mechanism (first locking means) 100 works in cooperation with the movable bracket. The tilt adjusting mechanism 100 includes a manual lever 102 which can be manually actuated to adjust the inclination of the steering axis. The manual level 102 can also be used to trigger the kick-up movement of the steering column. An auxiliary lock mechanism 200 is provided for temporarily locking the steering column in the kick-up position.

The tilt adjusting mechanism 100 includes a mechanical memory, which will be described in detail later, for recording the selected angular position of the steering axis. This mechanical memory serves to facilitate repositioning of the steering column at the selected angular position after being displaced to the kick-up position.

FIGS. 3 and 4 show the detailed structure of the adjustable tilt steering column of FIG. 1. The tilt adjusting mechanism 100, the auxiliary lock mechanism 200 and mechanical memory mechanism will be described in detail with reference to these drawings.

The tilt adjusting mechanism 100 includes a tooth plate 104 having locking tooth 106 along its lower edge. The tooth plate 104 is associated with a toothed lever 108 having tooth 110 meshing with the locking tooth 106 of the tooth plate 104. An elongated opening 112 is formed in the toothed lever 108 to receive a roller 114 rotatable about an axle 116 extending from a locking plate 118 which is biased upwardly toward the stationary bracket 24 by means of a spring 122 anchored to one end 120. The locking plate 118 pivots about a pivot pin 124 about which the tooth plate 104 and the manual level 102 also pivot. The locking plate 118 is also formed with an arcuate elongated opening 126 to which a connector pin 128 extending from the tooth plate 104 engages. This arcuate opening 126 is provided to allow some free pivotal movement of the tooth plate 104. The connector pin 128 also engages a slot in the stationary bracket which defines the limits of travel of the toothed plate 104 in such a way that at least one tooth thereof will mesh with the toothed lever 108. The edge 117 of the locking plate 118 opposes a locking strip 119 formed integrally with the manual lever 102 and is held in contact therewith by the force of a spring 123, visible only in FIG. 3. A link lever 130 engages the pin 128.

As shown in FIG. 5, the connector pin 128 may be formed with a tapered section at a position engaging to the link lever 130. The internal periphery of an opening formed in the link lever 130 and through which the connector pin 128 extends, is also formed in a tapered form. The link lever 130 is biased toward the tooth plate 104 by means of a bias spring 127 which seats on the link lever 130 at one end and on a cover 129 at the other end. This arrangement successfully prevents the link lever 130 from axially playing relative to the tooth plate 104 along the axis of the connector pin.

The link lever 130 is biased upwardly at a point 132 disposed forward of its pivotal axis, by means of a spring 134. The upper edge 136 of the link lever 130 opposed a transverse lever 138 integrally formed with the manual lever 102. The link lever 130 is formed with an essentially L-shaped opening 202 through which a transverse shaft 204 of the auxiliary lock mechanism 200 extends. The ends of the transverse shaft 204 pass through cut-outs in the side wall 140 of the stationary bracket 24 and are fixed to the movable bracket 26 by means of fastening screw 205. Since the connector pin 128 is fixed in place when the tooth plate 104 and the toothed lever 108 are engaged, and the shaft 204 and the bottom of the opening 202 are held in contact by the spring 134, the transverse shaft 204 will be held in place as long as both the spring force and the toothed engagement are effective.

The L-shaped opening 202 has an essentially vertical first section (second means) 206 and an essentially horizontal second section (third locking means) 208. The transverse shaft 204 is normally located at the bottom of the first section of the opening 202 when the steering column is in the driving position within tilt adjustment range. In this case, the link lever 130 is free to pivot about pin 128 but is held in place by the spring 134, while the shaft 204 is not free to pivot about the pivotal axis at 28. The latter is due to the fact that the first section 206 restrict the travel of transverse shaft 204 by engaging with the latter. However, the shaft 204 enters the second section 208 only when the steering column is moved to the kick-up position as will be explained later. A locking cam member 210 pivots about a pivot shaft 212 extending parallel to the transverse shaft 204 but fixed to the stationary bracket 24. The cam member 210 has a cam surface 214 opposing the transverse shaft 204. The upper edge 216 of the cam member 210 opposes the lever section 138 and cooperates therewith. A torsion spring 218 is wound around the shaft 212 to bias the cam surface of the cam member 210 toward the transverse shaft 204. The toothed lever 108 pivots about a pivot 142 extending from the pivot shaft 204 and through a hole in the end of the toothed lever distal from the roller 114.

A spring 144 is stretched between the transverse shaft 204 and an anchor 146 formed integrally in the floor of the stationary bracket 24. The spring 144 biases the movable bracket toward the kick-up position.

TILT ADJUSTMENT

When the tilt of the steering column is to be adjusted, the manual lever (manually operable device) 102 is operated by pulling the handle 103 up as shown in FIGS. 3, 4 and 6. Since the locking strip 119 of the manual lever 102 is located opposite the pivot from the handle the locking strip moves downward as the handle moves upward. The downward movement of the locking strip 119 causes the locking plate 118 to pivot counterclockwise as viewed in FIG. 3 about the pivot 124, against the tension force applied by the spring 122. As the locking plate 118 pivots about the pivot 124, the axle 116 extending therefrom drives the roller 114 along the inner periphery of the elongated opening 112 of the toothed lever (fourth means) 108 until the roller 114 reaches the end of the elongated opening 112 nearer to the pivot of the toothed lever 108. Further movement of the locking plate 118 disengages the toothed lever 108 from the tooth plate 104. This in turn allows free movement of the link lever 130 and transverse shaft 204. Thus, as long as the handle is held high enough to separate the toothed lever 108 and the tooth plate 104, the upper steering column 18 can be tilted up and down through the tilt adjustment range to the desired position.

Since the transverse bar 204 is secured to the movable bracket 26, the position of the transverse bar relative to the pivot shaft 212 shifts according to the steering position selected. This causes a corresponding displacement of the link lever 130 due to the opposing effects of the vertical section 206 of the L-shaped opening 202 and the spring 134. The displacement of link lever 130 is transmitted to the now-freely-pivotable tooth plate 104. Thus, although the tooth plate 104 cannot move fully out of the range of engagement with the teeth of the toothed lever 108 is pivotable about pivot 212, adjusted in accordance with the inclination of the upper steering column tube 14 and the steering wheel.

After moving the steering column to the desired position, the manual lever 102 is released. This allows the locking plate 118 to pivot back to its rest position by which pin 116 and roller 114 drive the toothed lever 108 back into engagement with the tooth plate 104. It can be seen that these teeth define an equal number of detent positions in the tilt adjustment range at which the steering column may be locked.

KICK-UP OPERATION

The kick-up operation serves to quickly move the steering wheel as far out of the driver's way as possible in order to facilitate entry and egress. To carry out this operation, the hendle 103 of the manual lever 102 is pushed down until the upper steering column "kicks up" into a position above the normal tilt adjustment range, as described previously.

Downward displacement of the manual lever 102 causes the link lever 130 to pivot downward about the connector pin 128 due to the action of the transverse lever 138 against the force of the spring 134, as shown in FIG. 6. Although the transverse shaft 204 is still not free to shift relative to the pivot shaft 212, i.e. to swing about pivotal axis 28, the link lever 130 can pivot about connector pin 128. Thus, relatively speaking, the transverse shaft 204 moves up the first section 206 of the L-shaped opening 202 as the manual lever 102 is lowered. This motion continues until the shaft 204 reaches the top 209 of the first section 206. At that point, as there is no further restraint to the effect of spring 144, the transverse shaft 204 quickly pivots as far as allowed, moving the upper steering column to the kick-up position. It should be noted that the kick-up position is defined by an elongated hole 209 to which the end of the transverse shaft remote from the opening 202 engages. At the kick-up position of the steering wheel, the transverse bar 204 contacts to front end of the hole 209 to restrict further upward movement of the upper steering column 14.

TEMPORARY LOCK AT KICK-UP POSITION

When the transverse shaft 204 is in the kick-up position, it no longer impedes movement of the cam plate 210. However, while the manual lever 102 is held in its lowermost position in which the kick-up operation is triggered, the transverse lever 138 abuts its upper edge 216 and so holds it in essentially the same position.

Figure 7:
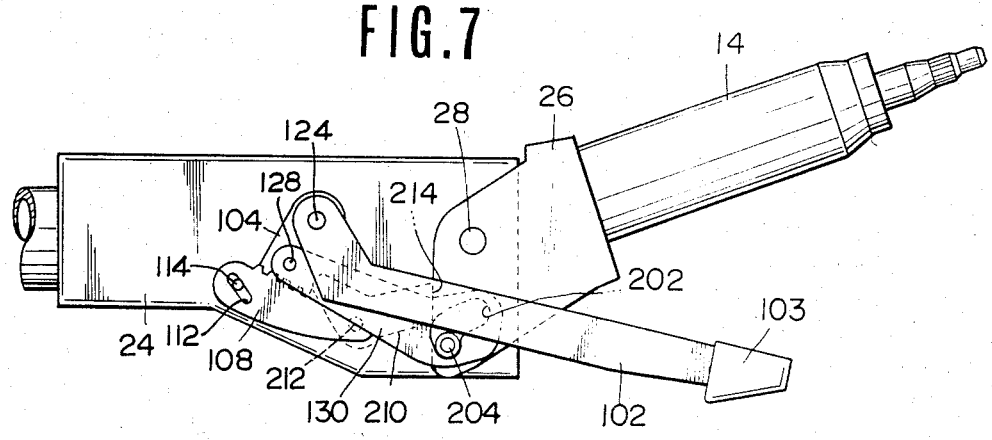
FIG. 7 is a fragmentary illustration showing kick-up operation in a position the movable bracket is allowed to move the kick-up position as the manual lever being operated.
Figure 8:
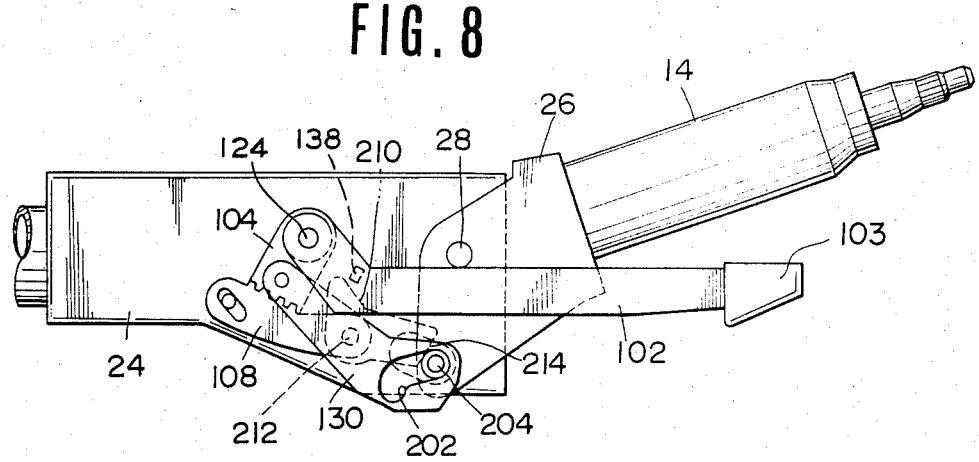
FIG. 8 is a fragmentary illustration showing temporary lock state.

When the manual lever 102 is released after triggering the kick-up operation as shown in FIGS. 3, 4 and 7, the cam plate 210 is allowed to wedge itself between the transverse shaft 204 and the pivot shaft 212. Specifically, the torsion spring 218 drives the cam plate downwards until the cam surface 214 engages the shaft 204. Thus, as long as the cam plate 210 remains so engaged, the transverse shaft 204 cannot move toward the pivot shaft 212; in other words, the steering wheel cannot be moved downward out of the kick-up position.

TEMPORARY LOCK RELEASE

To release the temporary lock established by engagement of the cam member 210 and the transverse shaft 204, the manual lever 102 is again depressed downwards. This causes the transverse lever 138 to push the upper surface 216 of the cam plate 210 opposite, the cam surface 214 from the pivot shaft 212 downwards so that the cam surface 214 moves upwards, disengaging from the transverse shaft 204.

Once disengaged, the transverse shaft 204 can be manually shifted back toward the pivot shaft 212, i.e. the steering column can be lowered from the kick-up position. As the upper steering column is lowered, the transverse shaft 204 moves along the second section 208 of the L-shaped opening 202 in the link lever 130. Once it reaches the intersection of the first and second section 206, 208, the force of the spring 134 takes effect to pivot the link lever upwards until the shaft 204 is resting at the bottom of the first section 206. Since the engagement between tooth plate 104 and toothed lever 108 is not influenced by the kick-up operation, the transverse shaft 204 can only be moved as far as where it was immediately before the kick-up operation, i.e. originally set driving position. That is, the toothed elements 104, 108 act as a mechanical recording device, allowing the upper steering column to be returned only to the steering wheel position last selected.

What is claimed is:
1. An adjustable tilt steering column comprising:
a steering column receiving a steering shaft with a steering wheel attached to its free end, said steering column including a first stationary component and a second movable component which is pivotable with said steering shaft for allowing tilt adjustment of the steering shaft relative to said first component;

a first locking means associated with said steering column for locking said second component of said steering column at a selected angular position, said angular position being variable between a first upper and a second lower extremes;

second means allowing said second component to move upwardly beyond said first extreme to a third uppermost position;

a third locking means associated with said second means and responsive to operation of the latter to lock said second component at said third uppermost position;

a fourth means for recording said selected angular position during operation of said second and third means; and a manually operable device for selectably disabling said first means to allow adjustment of said angular position to set a driving position within an adjusting range defined by said first and second extremes, for selectably activating said second means to move said second component to said uppermost position and locking the second component at said uppermost position by means of said third means, and for selectably disabling said third locking means to allow downward movement of said second component within said adjusting range to said set driving position.

2. The steering column as set forth in claim 1, wherein said fourth means is a mechanical device for mechanically recording said set driving position of said second component and allowing the second component to return said set driving position from said third position.

3. The steering column as set forth in claim 1, wherein said second means includes a spring member associated with said second component to bias the latter towards said uppermost position.

4. The steering column as set forth in claim 1, wherein said manually operable device comprises a single lever operable in a first direction to disable said first locking means and in a second direction for operating said second and third means.

5. The steering column as set forth in claim 4, wherein said lever is operative in said second direction during operation of said third locking means to disable said third means, thereby allowing downward movement of said steering column.

6. The steering column as set forth in claim 1, wherein said third means comprises a bar member fixed to and transversely extending through said second component, and a locking cam fixed to said first component and engageable with said bar member when said second component is in said uppermost position.

7. The steering column as set forth in claim 1, which further comprises a link member connecting said manually operable device to said first locking means, said link member defining a generally L-shaped opening through which said bar member extends, said L-shaped opening having first section in which said bar member rests during operation of said first means and which prevents movement of said second component with respect to said first component, and a second section into which said bar member enters during operation of said second and third means and which is oriented so as to allow movement of said second component relative to said first component.

8. The steering column as set forth in claim 7, which further comprises means for restricting axial play of said link member relative to said locking means.

9. The steering column as set forth in claim 8, wherein said means for restricting the axial play of said link member comprising a bias spring biasing the link member toward said locking means, and at lease partly conical shaft extending from said locking means, about which said link member is pivoted.

10. An adjustable tilt steering column comprising:

a steering column receiving a steering shaft with a steering wheel attached to its free end, said steering column including a first stationary component and a second movable component which is pivotable with said steering shaft for allowing tilt adjustment of the steering shaft relative to said first component;

a first locking means associated with said steering column for locking said second component of said steering column at a selected angular position, said angular position being variable between a first upper and a second lower extremes said first locking means including interengageable first and second members, each having engagement means, for latching said second component as a selected angular position;

second means allowing said second component to move upwardly beyond said first extreme to a third upper most position;

a third locking means associated with said second means and responsive to operation of the latter to lock said second component at said third uppermost position; and a fourth means, manually operable, for selectably releasing engagement between said first and second members of said first locking means to allow adjustment of the said annular position to set a driving position within an adjusting range defined by said first and second extremes, for selectably activating said second means to move said second component to said uppermost position by means of said third means, and for selectably disabling said third locking means to allow downward movement of said second component within said adjusting range to said set driving position from said uppermost position.

* * * * *